INVENTORS
GÜNTHER FRECH
WOLFGANG KAISER
HERBERT RAHN

BY Philip M. Bolton
ATTORNEY

United States Patent Office 3,440,600
Patented Apr. 22, 1969

3,440,600
METHOD FOR CONTROL SUPERVISION AND PROTECTION OF VEHICLES
Günther Frech, Stuttgart-Sonnenberg, Wolfgang Kaiser, Stuttgart-Vaihingen, and Herbert Rahn, Viernheim, Germany, assignors to International Standard Electric Corporation, New York, N.Y., a corporation of Delaware
Filed May 5, 1966, Ser. No. 547,941
Int. Cl. B61l 27/00, 25/02; G08g 1/01
U.S. Cl. 340—23                                   8 Claims This invention relates to a method for the control, supervision and protection of vehicles along a predetermined route, and more particularly to the control, supervision, and protection of rail-bound vehicles along a predetermined rail section.

In order to obtain better utilization of existing traffic ways and for adapting them to the continuously increasing transport volume, efforts are being made to increase the allowable speeds of the vehicles and to make the sequence of vehicles as close as is safely possible. This increases the demands placed on safety, protection and supervisory equipments, thereby necessitating the development of new systems capable of high speed control of vehicles travelling along predetermined routes. The invention is explained herein with reference to rail-bound vehicles, but it is to be understood that this shall in no way restrict the scope of practical application of the invention, since the principles are equally applicable to non-rail-bound vehicles.

One of the problems involved in such control systems is to provide a close train succession while also maintaining an unoccupied section of the route (block section) ahead of it, said unoccupied block section corresponding to at least the braking distance of the vehicle. This may be accomplished by detecting the distance between a vehicle and the preceding vehicle, and controlling the speed of said preceding vehicle to maintain the proper separation therebetween. When the spacing falls short of the predetermined safety distance, the second vehicle is slowed down or stopped.

One method of implementing such a system is to have each vehicle continuously report its position to a central control station which, from these incoming reports, makes the appropriate decisions and sends out control signals to the vehicles.

Some of the disadvantages of the method above described are that the trains are incapable on their own to ascertain the distance between them and their adjacent vehicles for initiating actions such as braking and acceleration. To accomplish this it is required to have data processing equipment in the central control station and in the equipment aboard the vehicle. This substantially increases the costs of such a system. Furthermore, it is difficult to determine train lengths and to ascertain and recognize the presence of unidentified vehicles.

Another prior art system for the control, supervision and protection of vehicles utilizes a central control station and marking points placed at regular intervals along the route to be supervised. As a vehicle passes the marking points the equipment aboard said vehicle processes the information and converts it to position information. This position information is then transmitted to the central control station which processes it and sends out control signals to said vehicles to control their brakes, motors, etc.

One of the problems involved in this type of system is that the information transmitted between the central control station and the vehicle must be transmitted during the time intervals between the passing of marking points, which intervals will vary according to the vehicle's speed. Therefore, even in the case of very high transmission speeds only a relatively small number of vehicle positions can be interrogated within the permissible cycle duration. This places a restriction on the distances between marking points. Another disadvantage of this system is that a special return indication channel must be provided.

Therefore, the main object of this invention is to provide an improved control, protection and supervision system for vehicles travelling along predetermined routes which avoids the disadvantages of the conventional systems.

The above-mentioned and other objects of this invention will become apparent by reference to the following description taken in conjunction with the accompanying drawings, and in which:

FIGURE 1b is a schematic block diagram of the equipment at the central control station shown in FIG. 1a;

FIGURE 1c is a schematic block diagram of the equipment aboard a vehicle shown in FIG. 1a.

According to this invention at least two line conductors are laid out along the route. The route is also subdivided into sections by means of marking point devices placed along said route at predetermined intervals. Connected to one end of said line conductors is a central control station, which among other things, transmits a train of counting pulses on said line conductors. Aboard a first vehicle are two counting devices, one of which (called the position counter) counts the marking point devices passed over by said vehicle, and the other of which (called the counting-pulse counter) counts the counting pulses transmitted by the central control station. When coincidence occurs between the counts of the two said counting devices aboard said first vehicle, a signal is transmitted by equipment aboard said vehicle to said central control station via said line conductors. Upon receipt of said signal from said vehicle the central control station ceases transmitting said counting pulses for a predetermined interval. During this predetermined interval the first vehicle may transmit messages to said central control station relating to vehicle identification, vehicle speed, vehicle acceleration, vehicle length, etc. At the end of said predetermined interval the central control station equipment starts to transmit the counting pulses again. At this point a third counter aboard said vehicle begins to count the counting pulses received by said vehicle after the end of said predetermined interval. This third counter continues to count said pulses until the next preceding vehicle detects coincidence between its first and second counters there aboard, and causes said central control station to cease transmitting said counting pulses. When said counting pulses are caused to cease by said next preceding vehicle, said third counter aboard the first vehicle will indicate the number of marking sections that separate first vehicle and said preceding vehicle, and initiate the proper control functions such as braking, accelerating, etc.

Figure 1A:
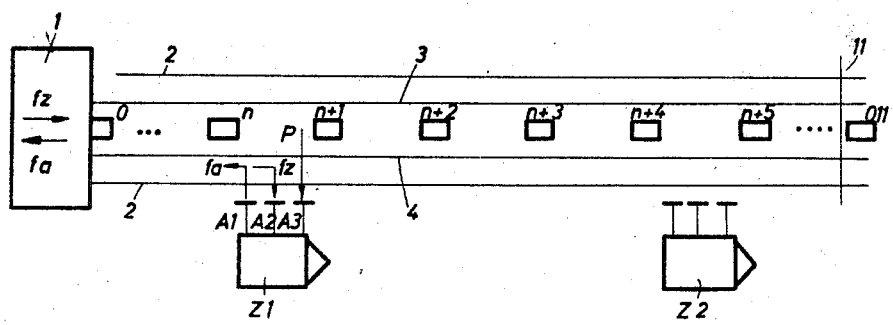
FIGURE 1a is a schematic representation of a route to be supervised.
Figure 1B:
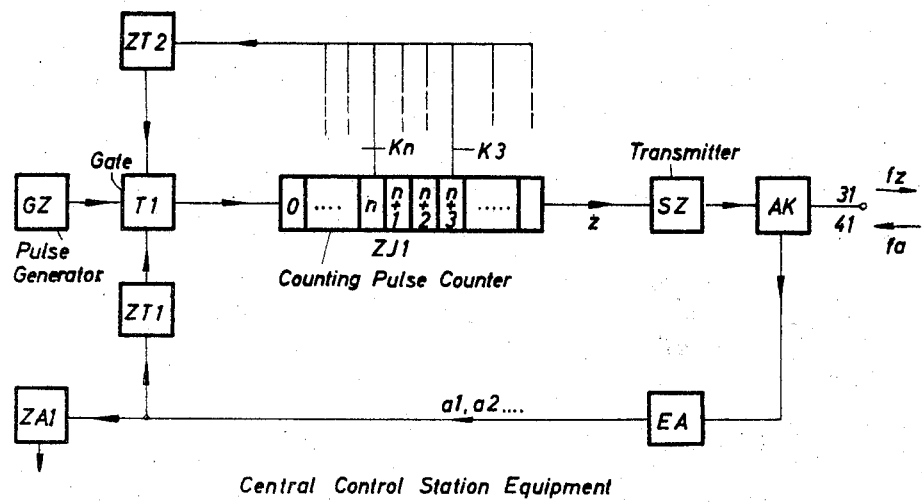
Figure 1C:
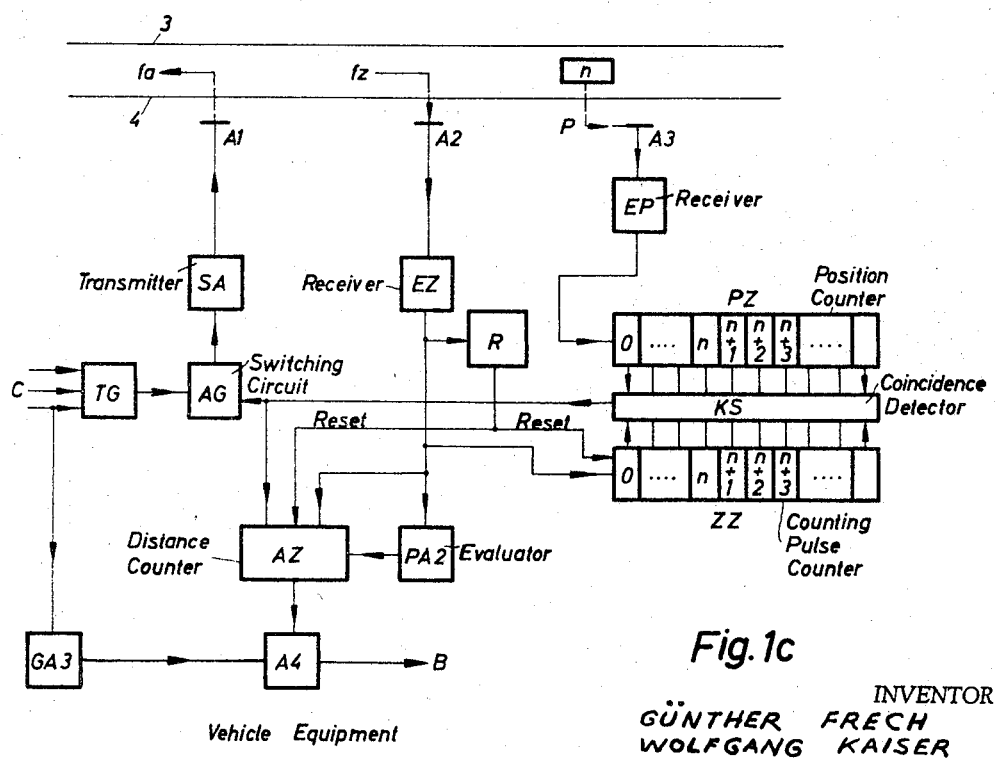

Alongside the two rails 2, FIGURE 1a, of the route section to be supervised, a conductor loop comprising the lines 3 and 4 are laid out. At predetermined intervals marking point devices $o, n, n+1, \ldots, n+5$ are also laid out along the route. Vehicles Z1 and Z2 are located within the subject route section, and receive incorfation relating to the marking point devices $n$ passed over via antenna A3 mounted on said vehicles and receiver EP. The number of marking point devices $n$ passed over by a vehicle are counted by position counter PZ, FIGURE 1c. By reading the count indicated by said position counter PZ one may determine in which section of the supervised route said vehicle is located.

Equipment within the central control station 1 (detailed in FIG. 1b) transmits a counting pulse frequency $fz$ to the line conductors 3 and 4. This is accomplished by means of a pulse generator GZ coupled to a counting pulse counter ZJ1 via gate T1. The output of counter ZJ1 is coupled to transmitting equipment SZ, the output of which is applied to lines 3 and 4 via coupling circuit AK. This generates a train of counting pulses (signal $fz$) which is received by the vehicles located within the route section via antenna A2 and receiver EZ (FIG. 1c), for example aboard vehicle Z1. These counting pulses $fz$ are counted by means of counting-pulse counter ZZ. When the position counter PZ is in coincidence with the counting-pulse counter ZZ (i.e. when both counters are in the same counting position) as determined by coincidence circuit KS, a signal $a1$ (FIG. 2) is sent via switching circuit AG, transmitter SA and antenna A1 to said central control station on lines 3 and 4. This signal may contain information relating to vehicle size, vehicle speed, vehicle position, or any other pertinent data which is determined by equipment donated by C (FIG. 1c) and coupled via translator TG, to transmitter SA. Equipment C may be any type of equipment commonly used in the art and is not detailed in FIG. 1c for the sake of clarity.

Figure 2:
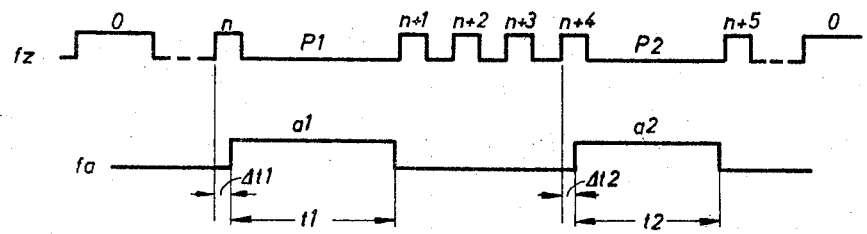
FIGURE 2 is a schematic representation of the counting pulses and the data frequency transmitted over the line conductors.

This signal $a1$ is received by the central control station 1 via coupling circuit AK. In receiver EA said signal is split up into its component parts (relating to vehicle length, vehicle speed etc.). This information is then coupled to evaluating equipment ZA1 which transfers the data to other equipment not essential to the operation of the instant invention. The output of receiver EA is also coupled to timing circuit ZT1 which is triggered on upon receipt of signal $a1$ and thereby blocks gating circuit T1. This interrupts the generation of counting pulse signal $fz$ since the path from pulse generator GZ to counter ZJ1 is broken. The predetermined time delay $t1$ of timer ZT1 generates an interval P1 in the sequence of counting pulses $fz$ as is illustrated in FIG. 2. At the end of this predetermined time delay $t1$ the transmission of said counting pulses $fz$ is continued by said central control station, since timing circuit ZT1 (FIGURE 1b) becomes unblocked, allowing the pulses from generator GZ to be coupled through to lines 3 and 4 via counter ZJ1.

It should be noted that the time delay $\Delta t1$ (FIGURE 2) between the generation of signal $a1$ and the triggering "on" of timer ZT1 (i.e. the generation of time interval $t1$ which causes a gap P1 in the transmission of the counting pulses) must be less than the duration of a counting pulse $n$ (FIGURE 2).

In the vehicle, at the time of coincidence between the position counter PZ and the counting-pulse counter ZZ, the distance counter AZ is switched on. The distance counter AZ then counts the number of counting pulses $fz$ transmitted by said central control station equipment 1 after said interval P1 and until said counting pulse sequence $fz$ is again interrupted by a coincidence condition between the counting-pulse counter and the position counters in the next preceding vehicle Z2. When the counting-pulse sequence $fz$ is interrupted by vehicle Z2 the distance counter AZ is stopped by means of pulse evaluator PA2 and the reading of distance counter AZ aboard vehicle Z1 corresponds to the distance between vehicle Z1 and the preceding vehicle Z2, measured in marking distances (i.e. distances between marking points).

Also mounted aboard the vehicles is an evaluator A4 (FIGURE 1c), which, from the information provided by the distance counter AZ and by the speed evaluator GA3, determines whether said vehicle should accelerate or decelerate. For example, a braking (or deceleration) operation would be initiated if the distance between the vehicle Z1 and the vehicle ahead Z2 is less than a safe braking distance corresponding to the present vehicle speed.

In the same manner as described above vehicle Z2 determines the distance between itself and the next preceding vehicle and initiates the proper controls in order to maintain a safe braking distance between itself and said next preceding vehicle.

After counter ZJ1 has been stepped through all of its positions (each position corresponding to a particular marking section of the route) it automatically recycles. The "0" counting position is given a distinct identification which differs from the other counting pulses. Upon reception of the "0" counting pulse resetting device R (FIGURE 1c) resets counters ZZ and AZ, thereby readying them for another cycle.

In the central control station equipment 1 there is further provided means permitting the marking of any random marking section as being occupied. To accomplish this, a line is coupled from the gating circuit T1 to each stage of the counting-pulse counter ZJ1 via switches K. When the switch K$n$ is closed and the counter ZJ1 is at position $n$, the timing circuit ZT2 is activated for a predetermined period of time, and blocks the transmission of further counting pulses via the gating circuit T1. This blocking is effected whenever the counting-pulse counter is set, by a counting pulse from generator GZ, to a step (e.g. $n+3$) in which the corresponding switch contact (e.g. K3) is closed.

During the interval determined by timing circuit ZT2 it is now possible for information to be fed into the system in the same way as transmitted by a train positioned within an occupied marking section during the intervals $a1$ or $a2$. This information may refer e.g. to a construction train positioned within the marking section, to a rail break, to a disturbed switch or point, or the like, and is inserted in the interrogation cycle.

While I have described above the principles of my invention in connection with specific apparatus, it is to be clearing understood that this description is made only by way of example and not as a limitation to the scope of my invention, as set forth in the objects thereof and in the accompanying claims.

We claim:
1. A method for the control and supervision of vehicles along a route from a central comprising the steps of:
   subdividing said route into predetermined sections;
   detecting and counting the number of said route sections passed by said vehicles at said vehicles;
   generating a train of counting pulses at said central station for transmission to said vehicles;
   transmitting said train of pulses to said vehicles;
   receiving and counting said pulses at said vehicles;
   detecting coincidence between the number of route sections passed and the number of counting pulses received at each of said vehicles;
   generating a signal responsive to said coincidence condition at a vehicle;
   stopping the generation of said train of counting pulses at said station for a predetermined interval responsive to said signal; and
   generating said train of counting pulses at said station after said predetermined interval.

2. The method of claim 1 further comprising the steps of:
   receiving and counting said counting pulses at said vehicles which are generated after said predetermined interval and until the next predetermined interval; and
   generating vehicle control signals at said vehicles responsive to the number of said pulses counted between said predetermined intervals and the speed of said vehicle, for controlling the operation thereof.

3. The method of claim 1 further comprising the step of generating a predetermined message at said vehicle and transmitting said message during said predetermined interval.

4. The method of claim 1 further comprising the step of:
   marking a particular route section;
   stopping the generation of said train of counting pulses at said station for a second predetermined interval responsive to said counting pulses representing said marked section;

generating a second signal at said station during said second interval relating to said marked section;

transmitting said second signal to said vehicles; and generating said train of counting pulses at said station after said second interval.

5. Apparatus for the control and supervision of vehicles along a route comprising:

means subdividing said route into predetermined sections;

first detecting means aboard said vehicle for detecting said subdividing means passed over by said vehicle;

first counting means coupled to said first detecting means for counting said subdividing means passed over by said vehicle;

a central control station coupled to said route at one end thereof;

pulse generating means at said central control station for generating a train of counting pulses;

first transmitting means at said central control station coupled to said pulse generating means and to said route for transmitting said counting pulses along said route to said vehicles;

first receiving means aboard said vehicle for receiving said counting pulses;

second counting means coupled to said first receiving means for counting said received counting pulses;

comparing means aboard said vehicle coupled to said first and second counting means for detecting when the number of counting pulses received is equal to the number of subdividing means passed over by said vehicle;

second transmitting means aboard said vehicle coupled to said comparing means and to said route for transmitting a signal to said central control station when said number of counting pulses received is equal to said number of subdividing means passed over by said vehicle;

second receiving means located at said central control station coupled to said route for receiving said signal;

first interrupting means at said central control station coupled to said second receiving means and to said pulse generating means for interrupting the generation of said counting pulses for a predetermined interval responsive to the receipt of said signal; and means coupled to said pulse generating means for causing said pulse generating means to start generating said counting pulses after a predetermined interval.

6. Apparatus according to claim 5 further comprising third counting means coupled to said comparing means and to said first receiving means for counting the number of counting pulses received after said predetermined interval and until a next preceding vehicle causes said counting pulses to be again interrupted for a predetermined interval, the resulting count of said third counting means corresponding to the number of route sections separating said vehicle and said next preceding vehicle.

7. Apparatus according to claim 5 further comprising means for transmitting a predetermined message to said central control station and to other vehicles via said route during said predetermined interval.

8. Apparatus according to claim 5 further comprising:

means coupled to said counting pulse generator at said central control station for marking a particular route section;

second interrupting means coupled to said marking means and to said pulse generator for interrupting the generation of said counting pulses for a second predetermined interval when said counting pulses represent said marked section;

means coupled to said route and to said second interrupting means for transmitting a second signal corresponding to the condition of said marked section to said vehicles; and means at said vehicles for receiving said second signal.

References Cited

UNITED STATES PATENTS 3,250,914 5/1966 Reich _____ 246—122
3,268,727 8/1966 Shepard _____ 246—122

JOHN W. CALDWELL, *Primary Examiner.*

H. COHEN, *Assistant Examiner.*

U.S. Cl. X.R.

235—150.24; 246—122; 340—31, 38